Feb. 18, 1958  H. E. ROBERTS  2,824,212

RESISTANCE WELDING METHODS AND APPARATUS

Filed Oct. 19, 1955

INVENTOR.
HOWARD E. ROBERTS
BY
Campbell, Brumbaugh, Free + Graves
his ATTORNEYS

United States Patent Office 2,824,212
Patented Feb. 18, 1958

2,824,212

RESISTANCE WELDING METHODS AND APPARATUS

Howard E. Roberts, Palos Verdes Estates, Calif., assignor to Fairchild Engine and Airplane Corporation, Hagerstown, Md., a corporation of Maryland Application October 19, 1955, Serial No. 541,470

5 Claims. (Cl. 219—117)

This invention relates to the resistance welding of thin walled metal tubes to thicker metal plates and, more particularly, to the construction of heat exchangers embodying these elements.

It has proven difficult to provide an efficient weld between thin walled tubes abutting thicker plates, this being necessary in various structures such, for example, as heat exchangers. Thus, such welded joints have failed to withstand the stresses and vibrations to which they may be subjected in certain environments.

The present invention provides methods for welding thin walled metal tubes to thicker metal plates which result in a completed structure of great strength and rigidity, this structure being resistant to strong vibratory and other forces such as may be encountered in certain applications such, for example, as in aircraft use. The foregoing is achieved by providing an orifice in the thicker plate or header of a diameter equal to the outside diameter of the tube which must be welded thereto in abutment. The thin walled tube and thicker plate are then supported with one end of the tube in the orifice, one welding electrode or a fixture being positioned against the outer wall of the orifice. A second welding electrode, preferably tapered, may then be urged into the open end of the tube and a high density welding current passed through the tube and orifice walls. This operation fuses the members and due to the electrode taper, swages the end of the tube against the orifice to forge the fused area. A very efficient weld between the thin walled tube and thicker plate results from the foregoing steps.

In a preferred embodiment of the invention, high conductivity metal coats the outer wall of the orifice, if it engages a welding electrode, or the inner wall of the end of the tube engaging the second welding electrode or both. By so coating the members to be welded, arcing and localized burning produced by high contact resistance are minimized.

Employing the principles of the present invention, a heat exchanger unit complete with stiffeners between the headers may be formed, this being accomplished by providing a matrix of dissolvable material for supporting all of the elements during the welding steps.

These and further advantages of the present invention will be more readily understood when the following description is read in connection with the accompanying drawings in which.

Figure 4:
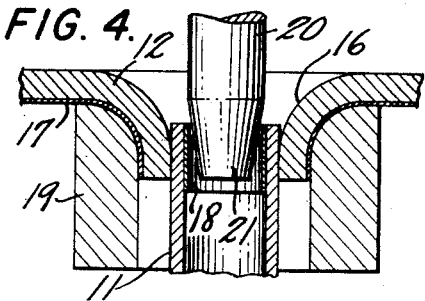
Figure 5:
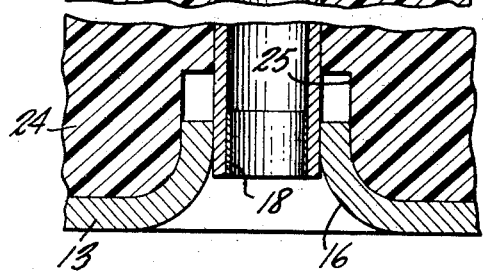

Figure 4 is a cross section taken axially of a thin walled tube illustrating in another embodiment of the invention the positioning of a thicker plate and welding components prior to the welding steps; and Figure 5 is a cross section taken axially of a thin walled tube through a portion of a heat exchanger showing the manner in which the heat exchanger may be constructed employing the principles of the present invention.

Figure 1:
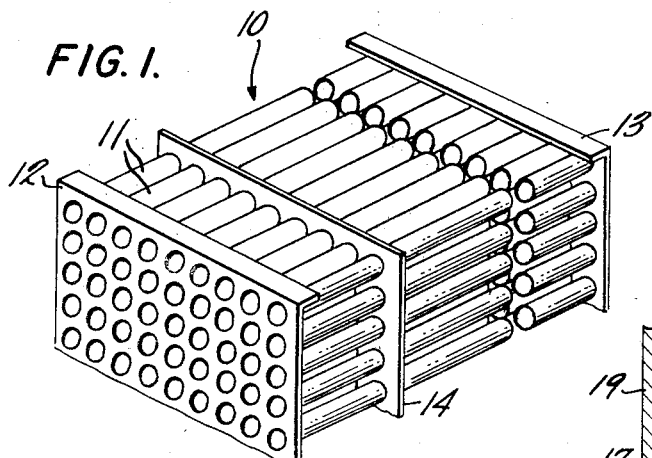
Figure 1 is a view in perspective of a portion of a heat exchanger which may be constructed in accordance with the principles of the present invention.

Referring to the invention in greater detail with particular reference to Figure 1, a heat exchanger 10 is built up of a number of thin walled tubes 11 joined at their ends in abutment to headers 12 and 13, stiffeners 14 being provided on the tubes 11 between the headers. It will be apparent that each of the tubes 11 must be efficiently welded to the headers 12 and 13 if the resultant heat exchanger 10 is to possess the desired characteristics of great strength, rigidity and resistance to heavy vibrations.

Figure 2:
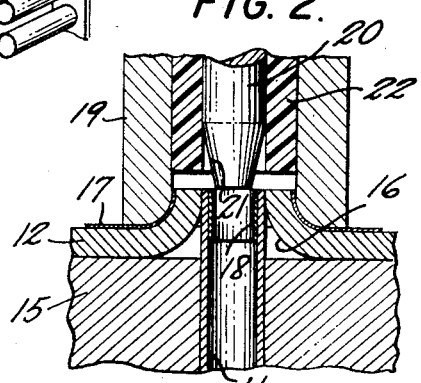
Figure 2 is a cross section taken axially of a thin walled tube illustrating the orientation of a thicker plate and welding components prior to the welding operations.

Examining Figure 2, a backup and holding fixture 15 supports the header 12 in which has been formed by punching an orifice 16 of the same diameter as the tube 11 positioned therein. It will be apparent that the portion of the interior wall of the orifice 16 near its mouth is composed of substantially parallel wall sections receiving the outer surface of the tube 11, which may also be supported by the fixture 15.

In order to minimize arcing and localized burning produced by high contact resistance, thin layers 17 and 18 of high conductivity metal such, for example, as copper or silver, their thickness being exaggerated to clarify the drawing, are respectively coated on the exterior wall of the orifice 16 and adjacent header surfaces, and on the interior end wall of the tube 11. The layers 17 and 18 are engaged by a tubular outer welding electrode 19 and a cylindrical inner welding electrode 20 formed with a tapered section 21 on its lower end. An insulating sleeve 22 preferably spaces the two electrodes.

With the welding components positioned as shown in Figure 2, the outer electrode 19 preferably being urged against the metal layer 17 coated on the header 12 and the orifice 16, the center electrode 20 is vertically actuated into the tube 11 with sufficient pressure to swage the tube end during the flow of welding current. Thus, immediately after the center electrode 20 has been inserted into the tube 11, high density electrical current flows between the electrodes 19 and 20. The high resistance of the contact surfaces between the tube 11 and the orifice 16 results in heating and fusion and the resultant softening of the abutting surfaces permits the electrode 20 to swage the tube 11 and forge the fused area, as shown at 23 in Figure 3. Of course, the vertical travel of the electrode 20 and consequent swaging and forging may be suitably controlled by conventional stops.

Figure 3:
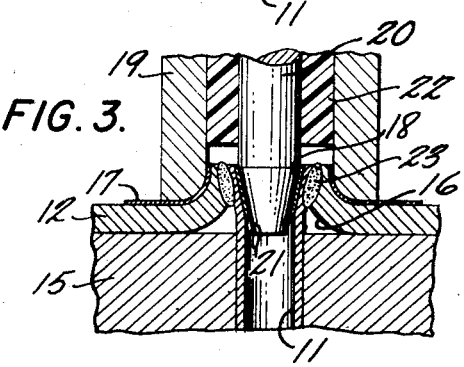
Figure 3 is a cross section similar to Figure 2 showing the completed weld.

A weld similar to that described in connection with Figures 2 and 3 may be achieved by positioning the welding components as illustrated in Figure 4, but in this instance, the backup and holding fixture 15 may be eliminated. Since the members involved are similar to those described in Figures 2 and 3, the same reference numerals will be used to designate identical parts. In this embodiment of the invention, the orifice 16 projects inwardly towards the tube 11, the outer welding electrode 19 being positioned to support the header 12. For clarity, the support means for the tube 11 has not been illustrated but it will be understood that it may comprise any conventional structure.

With the arrangement shown in Figure 4, the center electrode 20 is vertically actuated into engagement with the high conductivity metal layer 18 on the interior end wall of the tube 11. Due to the tapered section 21 of the electrode 20, the tube 11 will be swaged outwardly against the interior wall of the orifice 16 to forge the weld, as described in connection with Figure 3. Of course, the electrode 19 may be replaced by a suitable holding and alignment fixture if the electrode electrical lead is securely fastened to the header 12. In this instance, the high conductivity metal layer 17 would, of course, be omitted. In some instances, the header 12 may be of such thickness that the outer walls of the orifice 16 do not require support from either an electrode or a fixture during the welding operation.

It may be desirable in certain instances to assemble the heat exchanger 10 or portions thereof prior to welding the tubes 11 in abutment to the headers 12 and 13. This may be accomplished by supporting the tubes 11, stiffeners 14 and the headers 12 and 13 by means of a nonconductive matrix 24 formed of dissolvable material, as shown in Figure 5. Thus, the nonconductive matrix 24 fills the chambers formed between the headers 12 and 13, the stiffeners 14 and the tubes 11, except for annular chambers 25 provided adjacent to the mouth of each of the orifices 16. These chambers permit swaging of the tube ends during the welding operation, as described in connection with Figure 4.

One manner in which the matrix 24 may be properly formed is by first threading the stiffeners 14 on the tubes 11 and then inserting the tube ends into a pair of dummy headers (not shown). A suitable mold framework (not shown) may be utilized to support the stiffener plates 14 in their proper position. The dummy headers incorporate nipples around each tube end to produce the annular relief chambers 25 in the cast matrix 24. With the foregoing components assembled, the plaster or plastic material chosen to form the matrix 24 is cast according to conventional practices and the mold shell and dummy header plates removed. The headers 12 and 13 are then welded to the tubes 11 in accordance with the methods described in connection with Figure 4 by joining one of the electrodes to the headers. Subsequently, the matrix 24 is removed by dissolving or melting processes.

Obviously, the matrix 24 may be employed in manufacturing a heat exchanger in which the tubes 11 are welded to the headers 12 and 13 in accordance with the methods described in connection with Figures 2 and 3.

It will be apparent from the foregoing that the present invention provides a strong and efficient weld joint between thin walled tubes and thicker plates, this being accomplished with a minimum number of welding tools which may be readily manipulated by relatively unskilled operators. Obviously, the above described embodiments of the invention are illustrative only and modifications thereof will occur to those skilled in the art. Therefore, the invention is not to be limited to the specific apparatus disclosed herein but is to be defined by the appended claims.

I claim:

1. A method of welding a thin walled metal tube to a thicker metal plate comprising the steps of punching the plate to form an orifice extending from the plate with its mouth defined by substantially parallel wall sections of a diameter substantially equal to the outer tube diameter, supporting the tube and the plate in fixed relation with one end of the tube positioned in the orifice, urging a tapered welding electrode into the end of the tube, and passing a high density welding current between the welding electrode and the plate substantially perpendicular to the tube wall.

2. A method of welding a thin walled metal tube to a thicker metal plate comprising the steps of punching the plate to form an orifice extending from the plate with its mouth defined by substantially parallel wall sections of a diameter substantially equal to the outer tube diameter, supporting the tube and the plate in fixed relation with one end of the tube positioned in the orifice, abutting a welding electrode against the outer wall of the orifice, urging a tapered welding electrode into the end of the tube, passing a high density welding current between the welding electrodes to soften and fuse the metal at the abutment of the tube and the header, and actuating the tapered welding electrode further into the tube to swage the tube end and forge the fused metal.

3. A method as defined in claim 2 in which the orifice is punched to project in a direction opposing the direction of movement of the tapered welding electrode.

4. A method as defined in claim 2 in which the orifice is punched to project in the direction of movement of the tapered welding electrode.

5. A method of welding thin walled tubes to thicker headers to form a heat exchanger comprising the steps of positioning at least one stiffening plate on the tubes, providing a dissolvable nonconductive matrix carrying spaced relief chambers on each side in the chamber to be formed between the headers, tubes and stiffeners, punching the plates to form orifices extending from the plates with their mouths defined by substantially parallel wall sections of a diameter substantially equal to the outer tube diameter, positioning the headers against the matrix with the annular relief chambers adjacent to the orifices and the tube ends respectively positioned in the orifices, welding the tubes to the headers by electrically connecting the header to one welding electrode, urging a tapered second welding electrode into the end of each of the tubes, passing a high density welding current between the welding electrodes to soften and fuse the metal at the abutment of the tube and the header, and actuating the tapered welding electrode further into the tube to swage the tube end and forge the fused metal.

References Cited in the file of this patent

UNITED STATES PATENTS

| | | |
|---|---|---|
| 1,008,628 | Brown | Nov. 14, 1911 |
| 1,219,137 | Murray | Mar. 13, 1917 |
| 1,490,191 | Allcutt | Apr. 15, 1924 |
| 1,499,172 | Greenslade et al. | June 24, 1924 |
| 1,538,590 | Randles | May 19, 1925 |
| 1,703,527 | Henshall | Feb. 26, 1929 |
| 2,099,186 | Anderegg | Nov. 16, 1937 |
| 2,296,999 | Kottes | Sept. 29, 1942 |
| 2,320,920 | Fletcher | June 1, 1943 |
| 2,368,403 | Barnes | Jan. 30, 1945 |
| 2,389,175 | Woods | Nov. 20, 1945 |
| 2,437,740 | Haynes | Mar. 16, 1948 |
| 2,614,198 | Avery et al. | Oct. 14, 1952 |